(12) United States Patent
Combernoux et al.

(10) Patent No.: US 10,309,503 B2
(45) Date of Patent: Jun. 4, 2019

(54) PRELOADING DEVICE FOR A ROLLER SCREW MECHANISM GUIDED IN ROTATION

(71) Applicant: THALES, Courbevoie (FR)

(72) Inventors: Thomas Combernoux, Cannes la Bocca (FR); Alain Blanc, Cannes la Bocca (FR); Damien Chassoulier, Moirans-Sartoux (FR); Yannick Baudasse, Cannes la Bocca (FR)

(73) Assignee: THALES, Courbevoie (FR)

( * ) Notice: Subject to any disclaimer, the term of this patent is extended or adjusted under 35 U.S.C. 154(b) by 526 days.

(21) Appl. No.: 14/713,652

(22) Filed: May 15, 2015

(65) Prior Publication Data

US 2015/0330488 A1    Nov. 19, 2015

(30) Foreign Application Priority Data

May 16, 2014    (FR) ..................................... 14 01107

(51) Int. Cl.
| | |
|---|---|
| *F16H 25/00* | (2006.01) |
| *F16H 25/22* | (2006.01) |
| *F16H 25/20* | (2006.01) |
| *F16C 41/02* | (2006.01) |
| *F16C 19/08* | (2006.01) |

(Continued)

(52) U.S. Cl.
CPC ......... *F16H 25/2266* (2013.01); *F16C 41/02* (2013.01); *F16H 25/2006* (2013.01); *F16H 25/2252* (2013.01); *F16C 19/08* (2013.01); *F16C 19/522* (2013.01); *F16C 19/542* (2013.01); *F16H 2025/228* (2013.01); *Y10T 74/18576* (2015.01)

(58) Field of Classification Search
CPC ........ F16C 41/02; F16C 19/08; F16C 19/522; F16C 19/542; F16H 25/2006; F16H 25/2252; F16H 25/2266; F16H 2025/228; Y10T 74/18576
See application file for complete search history.

(56) References Cited

U.S. PATENT DOCUMENTS

| 2,683,379 | A |   | 7/1954 | Strandgren |
| 3,595,094 | A | * | 7/1971 | Lemor ................ F16H 25/2252 |
| | | | | 74/424.92 |

(Continued)

FOREIGN PATENT DOCUMENTS

| DE | 9214062 U1 | 12/1992 |
| DE | 102010011821 A1 | 12/2011 |

(Continued)

*Primary Examiner* — Victor L Macarthur
(74) *Attorney, Agent, or Firm* — Baker & Hostetler LLP

(57) ABSTRACT

A linear actuator comprises a roller screw mechanism guided in rotation with respect to a structure by two angular-contact ball bearings, the roller screw mechanism comprising rollers interposed between an endless screw and two tapped rings which are joined together in rotation and free in translation. Each tapped ring is secured to an inner ring of a ball bearing. The linear actuator further comprises a single preloading device capable of applying load between two outer rings of the angular-contact ball bearings respectively, thereby simultaneously allowing the loading of the roller screw mechanism and the rotational guidance of the roller screw mechanism with respect to the structure.

11 Claims, 4 Drawing Sheets

(51) Int. Cl.
  *F16C 19/52*  (2006.01)
  *F16C 19/54*  (2006.01)

(56) References Cited

U.S. PATENT DOCUMENTS

| | | | | |
|---|---|---|---|---|
| 3,726,151 A | * | 4/1973 | Lemor | F16H 25/2006 |
| | | | | 74/424.92 |
| 3,884,090 A | * | 5/1975 | Dock | F16H 25/2252 |
| | | | | 74/424.92 |
| 3,965,761 A | * | 6/1976 | Stanley | F16H 25/2266 |
| | | | | 74/424.92 |
| 4,033,194 A | * | 7/1977 | Stanley | F16H 25/2266 |
| | | | | 74/424.92 |
| 4,470,646 A | * | 9/1984 | Fuchsluger | F16C 19/50 |
| | | | | 384/550 |
| 4,576,057 A | * | 3/1986 | Saari | F16H 25/2266 |
| | | | | 74/424.92 |
| 6,648,568 B2 | * | 11/2003 | Roseliep | B23D 37/08 |
| | | | | 384/45 |
| 2015/0330488 A1 | * | 11/2015 | Combernoux | F16H 25/2266 |
| | | | | 74/89.23 |

FOREIGN PATENT DOCUMENTS

EP      0603067 A1   6/1994
FR      2699633 A1   6/1994

\* cited by examiner

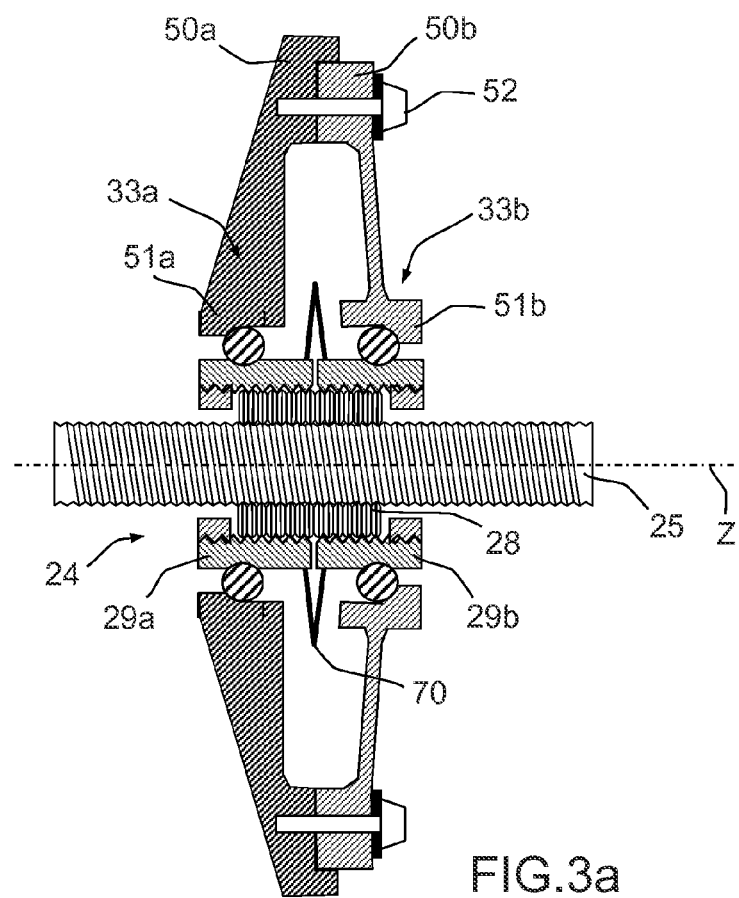
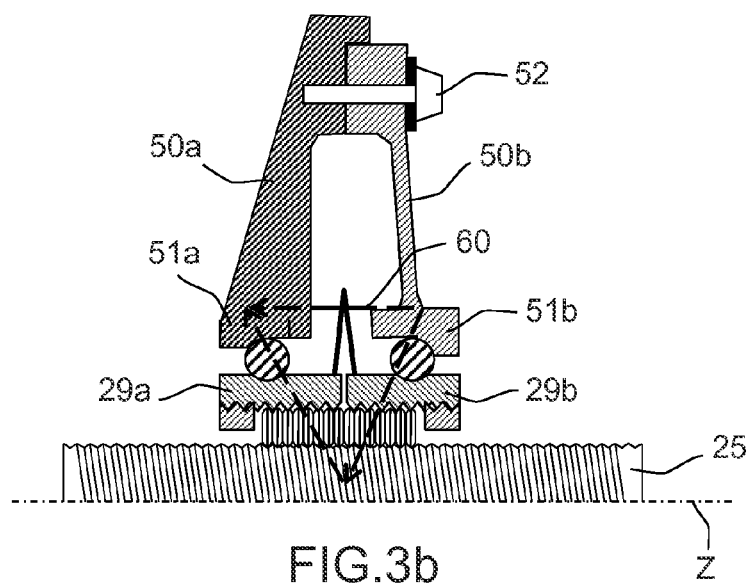

PRELOADING DEVICE FOR A ROLLER SCREW MECHANISM GUIDED IN ROTATION

CROSS-REFERENCE TO RELATED APPLICATION

This application claims priority to foreign French patent application No. FR 1401107, filed on May 16, 2014, the disclosure of which is incorporated by reference in its entirety.

FIELD OF THE INVENTION

The present invention relates to the field of satellite roller screw mechanisms that convert a rotational movement into a translational movement, and more specifically a roller screw mechanism guided in rotation with respect to a structure and equipped with a preloading device capable of compensating for lash within the mechanism. The invention finds a particular usefulness in the field of aerospace notably in the creation of linear actuators.

BACKGROUND

Linear actuators are used in various systems carried onboard a satellite, such as for orienting propulsion devices devoted to the change of orbit or for keeping a satellite in position in its orbit for example. In these systems an electric motor transmits a rotational movement to a screw-nut mechanism that converts the rotational movement into a translational movement. In order to improve the conversion efficiency or when a high degree of precision is required in the movement, mechanisms of the roller screw type may be used. Numerous linear actuators use satellite roller screw mechanisms, particularly on account of their long life and compactness.

FIG. 1 depicts a linear actuator comprising a roller screw mechanism. In the known way, the roller screw mechanism 10 comprises rollers 9 interposed between an endless screw 11 and two tapped rings 12a and 12b connected to a housing 13. The housing is guided in rotation with respect to the structure 14 by means of a rolling bearing 15. In the example depicted, the housing is rotationally driven by a rotary motor 16. The endless screw 11 is connected to the structure in rotation and free in translation. The rotational movement of the housing 13 allows the endless screw 11 to be driven translationally with respect to the structure. The principle of roller screw mechanisms is known and is not referred to here, particularly the means that allow the rollers to be returned to a central position with respect to the two tapped rings at the end of each turn of the endless screw.

There are various preloading devices for roller screw mechanisms. These devices, which apply a preload to the mechanism in order to take up lash within the mechanism are commonly employed in the field of aerospace. When the mechanism is required to be subjected to high levels of vibration and to operate in a strong vacuum, as is notably the case during the launch of a spacecraft, the repeated relative axial movements between the housing, the rollers and the tapped rings generate repeated impacts which may damage the elements of the mechanism or cause them to cease. In one known embodiment, an axial preload is applied between the two tapped rings, so as to keep the moving parts in contact with one another. Various mechanisms capable of applying a compressive preload between the two tapped rings are known.

Known in particular is the preloading device described by the patent application published under the reference FR2699633, the principle of which is depicted in FIG. 1. The two tapped rings 12a and 12b are mounted in the housing 13 in such a way that a first tapped ring, here referenced 12a, is secured to the housing, and a second tapped ring, here referenced 12b, is connected in rotation to the housing and free in translation. The preloading device is a spring mechanism 17 comprising a compression coil spring 18 placed around the endless screw and between two bearing rings 19a and 19b. The bearing ring 19a is in contact with the tapped ring 12b. The bearing ring 19b is in contact with a preloading nut 20 mounted on the housing so that a compressive force can be applied to the coil spring.

The linear actuator consists of the roller screw mechanism 10 guided in rotation by the rolling bearing 15. Rotational guidance is also exposed to high levels of vibration and to the strong vacuum conditions. For this reason it too comprises a preloading device. In the example depicted in FIG. 1, the rolling bearing consists of hard preload rolling bearings of the super duplex type. The bearing 15 comprises two rows of angular-contact ball bearings mounted in the DF configuration. The inner rings 21a and 21b of the two rows of bearings are loaded by means of a preloading nut 22 mounted on the structure.

Thus, the linear actuator comprises two preloading devices capable respectively of preloading the roller screw mechanism and of guiding the rotation thereof relative to the structure. This results in a linear actuator which is complex, the preloading of which requires a high number of components (bearing rings, coil spring, preloading nuts, preloaded super duplex rolling bearings, etc.). All of these components, which are essentially made of stainless steel, represent a significant mass and volume. The linear actuator is also complex to design and to manufacture. It is therefore still desirable to have available a linear actuator that incorporates a preloading device that is simple, inexpensive, and compatible with the most ambitious requirements of the field of aerospace.

SUMMARY OF THE INVENTION

To this end, one subject of the invention is a linear actuator comprising a roller screw mechanism guided in rotation with respect to a structure by means of a first and a second angular-contact ball bearing, the roller screw mechanism comprising rollers interposed between an endless screw and a first and a second tapped ring which are joined together in rotation and free in translation. The first and second tapped rings are secured to a respective inner ring of the first and of the second angular-contact ball bearings. The linear actuator comprises a single preloading device capable of applying load between two outer rings of the first and of the second angular-contact ball bearings respectively, thereby simultaneously allowing the loading of the roller screw mechanism and the rotational guidance of the roller screw mechanism with respect to the structure.

Advantageously, the tapped rings constitute the inner rings of the two ball bearings.

Advantageously, the tapped rings are connected by means of a key or a metal bellows.

Advantageously, the linear actuator comprises a hard preloading device capable of applying load between the outer rings brought into contact with one another.

Advantageously, the preloading device comprises a bearing surface and an elastic ring clamping the two outer rings in contact with one another and comprising a set of clamping screws which is configured to apply load to the elastic ring.

Advantageously, the linear actuator comprises an elastic preloading device capable of applying load between the two outer rings distant from one another.

Advantageously, the structure comprises a first and a second half-shell which are secured respectively to the first and second outer rings. The preloading device is configured to apply a load that tends to bring the two outer rings closer together, rotational guidance being afforded by the two ball bearings mounted in the "DF" configuration.

Advantageously, the structure comprises a first and a second half-shell which are secured respectively to the first and second outer rings. The preloading device is configured to apply a load that tends to move the two outer rings apart, rotational guidance being afforded by the two ball bearings mounted in the "DB" configuration.

Advantageously, the endless screw and the structure are connected in rotation and free in translation.

Advantageously, the endless screw and the structure are connected by means of a key or of a metal bellows.

Advantageously, the linear actuator comprises a rotary motor capable of driving the rotation of the tapped rings of the roller screw mechanism with respect to the structure.

Advantageously, the rollers comprise circular grooves in contact with the endless screw and with the tapped rings.

BRIEF DESCRIPTION OF THE DRAWINGS

The invention will be better understood and other advantages will become apparent from reading the detailed description of one embodiment given by way of example in the following figures.

FIGS. 3a and 3b depict a second example of a linear actuator according to the invention comprising a roller screw mechanism guided in rotation.

For the sake of clarity, in various figures the same elements will bear the same references.

DETAILED DESCRIPTION

Figure 1:
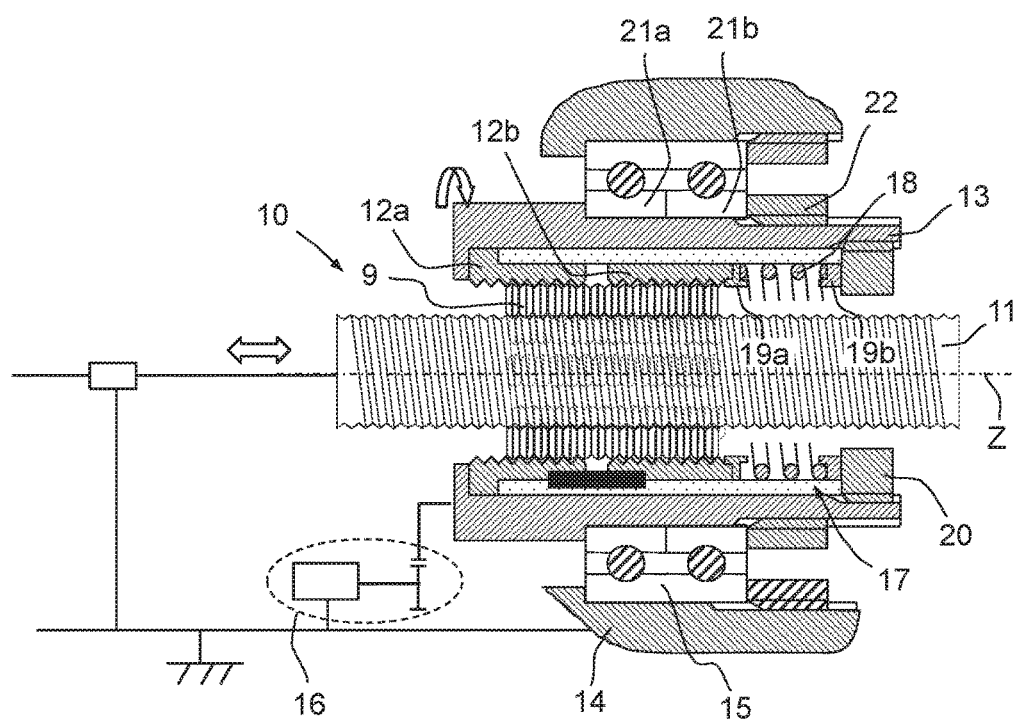
FIG. 1, already introduced, depicts a linear actuator comprising a roller screw mechanism according to the known state of the art.

The invention relates first of all to a linear actuator intended to be carried onboard a spacecraft, for example for orienting the thrust of thrusters with respect to the main structure of the satellite or alternatively for orienting reflectors used in space telecommunications. A linear actuator comprising a rotary electric motor and a roller screw mechanism providing the conversion into a translational movement is envisaged. The linear actuator comprises a roller screw mechanism and a rotational guidance which are coaxial. The figures depict one specific configuration of the linear actuator, referred to as a "translating screw" configuration, in which the motor drives the outer housing of the roller screw mechanism in rotation with respect to a structure, it in turn driving a translational movement of the endless screw with respect to the structure. In an alternative configuration, referred to as a "translating nut" configuration, the motor drives the endless screw of the roller screw mechanism in rotation with respect to the structure, thereby causing a translational movement of the external housing of the roller screw mechanism with respect to the structure. The invention is not restricted to the particular application of a linear actuator in a translating screw configuration carried onboard a satellite but more broadly covers a roller screw mechanism of axis Z guided in rotation with respect to a structure about that same axis Z.

There are two broad families of roller screws. In a first family, the endless screw, the rollers and the nut are all threaded or tapped with the same pitch. Thus, upon relative rotation of the nut with respect to the screw there is no axial movement of the rollers. This first family is not very precise and the risk of static indeterminancy between the rollers on the one hand and the nut and screw on the other is great. In a second family, the screw and nut are still threaded in the case of the first and tapped in the case of the second but the rollers have circular grooves. In operation, the rollers move axially and a recirculation mechanism is provided. More specifically, recirculation may be provided for each complete turn of the rollers in a longitudinal slot made in the nut. Cams fixed at the ends of the nut disengage the roller from the screw and insert it into the slot in the nut so that it can be moved axially. This second family affords greater precision in the linear movement of the screw by comparison with the first family. The contact of the grooves in the rollers with the screw and with the nut presents less of a risk of static indeterminancy than is the case with the first family.

The invention relates to a preloading device for such a rotationally guided roller screw mechanism. The overall idea behind the present invention is that of providing simultaneous preloading of the roller screw and of the bearing guiding the rotation of the roller screw. The invention is particularly well suited to the second family of roller screws. This is because the clearances involved in the first family at the contacts between the rollers, the screw and the nut are generally greater than those of the second family. A common preload of the bearing and of the screw threads leads to compensation for lash that may prove incompatible in the first family. By contrast, in the second family the clearances involved in the bearing and in the roller screw are of the same order of magnitude. In the case of the second family, common preloading can therefore easily compensate for lash both in the bearing and in the roller screw.

Three possible ways of embodying the preloading device are described in what follows. Simultaneous preloading of the roller screw and rotational guidance thereof significantly simplifies the systems known from the prior art.

Figure 2A:
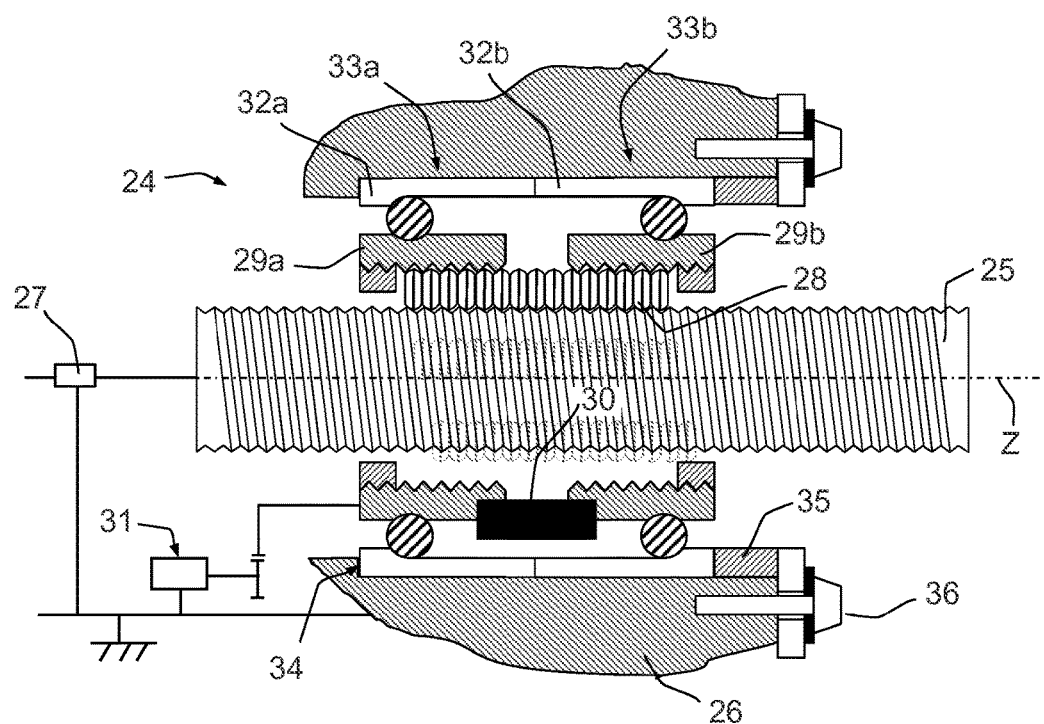
FIGS. 2a and 2b depict a first example of a linear actuator according to the invention comprising a roller screw mechanism guided in rotation.
Figure 2B:
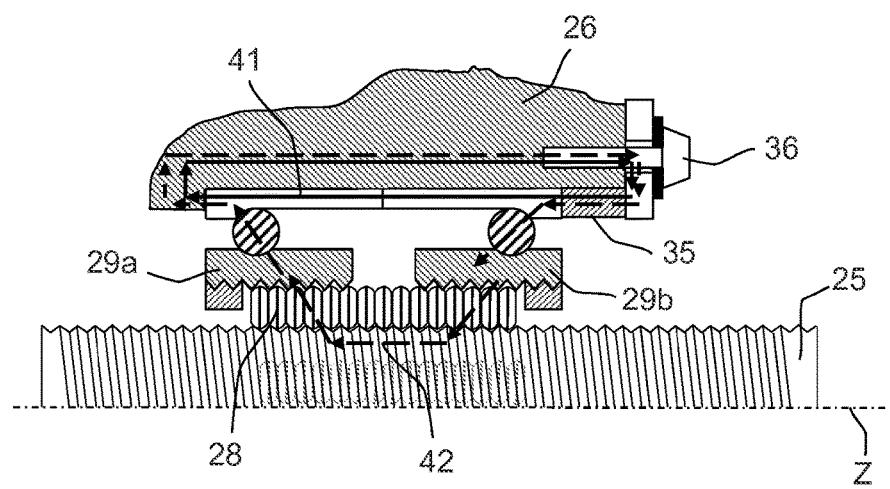

FIGS. 2a and 2b depict a first example of a linear actuator according to the invention comprising a roller screw mechanism of axis Z, guided in rotation with respect to a structure about that same axis Z. The roller screw mechanism 24 comprises an endless screw 25 of axis Z, connected to the structure 26 in rotation and free in translation. It is envisaged for this sliding connection 27 between the endless screw 25 and the structure 26 to be achieved by means of a key or of a metallic bellows. The roller screw mechanism 24 also comprises rollers 28 interposed between the endless screw 25 and two tapped rings 29a and 29b. The principle of operation of the roller screw thus formed is similar to that of the prior art already introduced. Typically, the external surface of the satellite rollers 28 is provided with grooves spaced apart at a pitch equal to the screw pitch of the endless screw 25 and of the two tapped rings 29a and 29b. The grooves have circular sections about the main axis of each roller which is parallel to the axis Z of the endless screw 25.

The grooves are in contact with the threads of the endless screw 25 and with the threads of the tapped rings 29a and 29b.

The rollers are angularly distributed about the endless screw. A dividing cage (not depicted) is generally employed in order to maintain the angular separation of the rollers. The endless screw also comprises means for returning the rollers to a central position that is axially symmetric with respect to the two tapped rings at the end of each turn of the endless screw. These means, which have not been depicted in the figures, usually consist of a recess formed inside the two tapped rings over a length exceeding the length of a roller and by cam surfaces formed on the tapped rings near the angular region corresponding to this recess.

The two tapped rings 29a and 29b are joined together in rotation and free in translation by connecting means 30, preferably consisting of a key or of a metal bellows. The roller screw thus defined allows a rotational movement generated by a rotary motor 31 and transmitted to the tapped rings to be converted into a translational movement of the endless screw 25.

Rotational guidance of the roller screw mechanism with respect to the structure about the axis Z is performed by means of two rows of angular-contact ball bearings mounted in the DF configuration. A first ball bearing 33a comprises an outer ring 32a and an inner ring secured to the tapped ring 29a. Likewise, a second ball bearing 33b comprises an outer ring 32b secured to the structure and an inner ring secured to the tapped ring 29b. In the example depicted in the figures, the tapped rings 29a and 29b of the roller screw mechanism constitute the inner rings of the ball bearings 33a and 33b. For that, each of the tapped rings, 29a and 29b respectively, comprise a groove formed in the outer surface of the tapped ring, for guiding the balls of the ball bearings, 33a and 33b respectively. Note though that the alternative whereby the tapping of the roller screw is not machined directly in the rings of the rolling bearings but made in intermediate components secured to the rings of the rolling bearings is also contemplated.

The outer rings 32a and 32b of the two ball bearings 33a and 33b are mounted in a bore of the structure. The outer ring 33a is in abutment along a first face with a bearing surface 34 of the structure and along a second face with the outer ring 33b. The outer ring 33b is in contact along a first face with the outer ring 33a and along a second face with an elastic ring 35. A set of clamping screws 36 is mounted on the structure so as to compress the elastic ring 35.

The mechanical stop 34 and the elastic ring 35 clamping the two outer rings 32a and 32b form, with the set of clamping screws 36 that is configured to apply load to the elastic ring, the device for preloading the linear actuator. This preloading device is particularly advantageous because it allows simultaneous loading of the roller screw mechanism and rotational guidance of the roller screw mechanism with respect to the structure. FIG. 2b illustrates the two load paths applied simultaneously by the preloading device: a first load path 41 between the structure and the outer rings of the ball bearings; and a second load path 42 between the structure and the endless screw, via the balls, the angular contacts of the rolling bearings, the tapped rings and the rollers. Lash is first of all taken up between the inner rings of the rolling bearing and the rollers and then between the outer rings of the rolling bearing. Control over the internal loading within the double rolling bearing and within the roller screw is thus guaranteed by this compensation for lash. Residual load caused by the tightening of the clamping screws therefore passes either via the elastic ring or via the outer rings of the rolling bearings.

The linear actuator simplifies the combining of the roller screw and the rotational guidance thereof. The number of components is greatly reduced. The strings of dimensions are simplified. The actuator performance is improved, particularly aiming performance. The linear actuator incorporates a single preloading device capable of compensating for lash in both mechanisms. The method of manufacture and of preloading of the actuator is simpler and less expensive.

FIGS. 3a and 3b depict a second example of a linear actuator according to the invention comprising a roller screw mechanism guided in rotation with respect to a structure. This second example of a linear actuator comprises components identical to the first example described in FIGS. 2a and 2b. The components that are common bear the same references in FIGS. 3a and 3b. This second example also comprises different components that we shall now describe.

The roller screw mechanism 24 comprises an endless screw 25 and rollers 28 interposed between the endless screw 25 and two tapped rings 29a and 29b. The two tapped rings 29a and 29b are connected to one another in rotation and free in translation, through connecting means 70 consisting of a metal bellows, of pins or of keys. The roller screw thus defined is able to convert a rotational movement transmitted to the threaded rings into a translational movement of the endless screw 25. As before, rotational guidance of the roller screw mechanism with respect to the structure is performed by means of two rows of angular-contact ball bearings 33a and 33b mounted in the DF configuration. The tapped rings 29a and 29b of the roller screw mechanism 24 constitute the inner rings of the ball bearings.

Unlike in the first example of a linear actuator, the two ball bearings are not mounted in contact with one another in a bore of the structure. In this second example, the structure comprises two half-shells 50a and 50b connected by a set of clamping screws 52. The outer ring 51a of the ball bearing 33a is secured to the first half-shell 50a of the structure. The outer ring 51b of the ball bearing 33b is secured to the second half-shell 50b of the structure. As depicted in FIGS. 3a and 3b, the outer ring and the half-shell may consist of one and the same one-piece component, making it possible to reduce the number of actuator components and simplify the manufacture thereof. The outer rings 51a and 51b of the two ball bearings are not in contact with one another. In this example of the ball bearings being mounted in the DF configuration, the set of clamping screws 52 is configured to apply a force that tends to move the two outer rings 51a and 51b that form the device for preloading the linear actuator closer together. As in the first example, this single preloading device advantageously allows simultaneous loading of the roller screw mechanism and rotational guidance of the roller screw mechanism with respect to the structure. In this second example, the two outer rings are not in contact with one another and the preload is elastic. As illustrated by FIG. 3b, the preloading device allows lash to be taken up by means of a single load path 60 between the half-shells of the structure and the endless screw, via the balls, the angular contacts of the rolling bearings, the tapped rings and the rollers. This elastic preloading device advantageously makes it possible to limit the risk of seizure by rubbing of contacting parts.

Figure 4A:
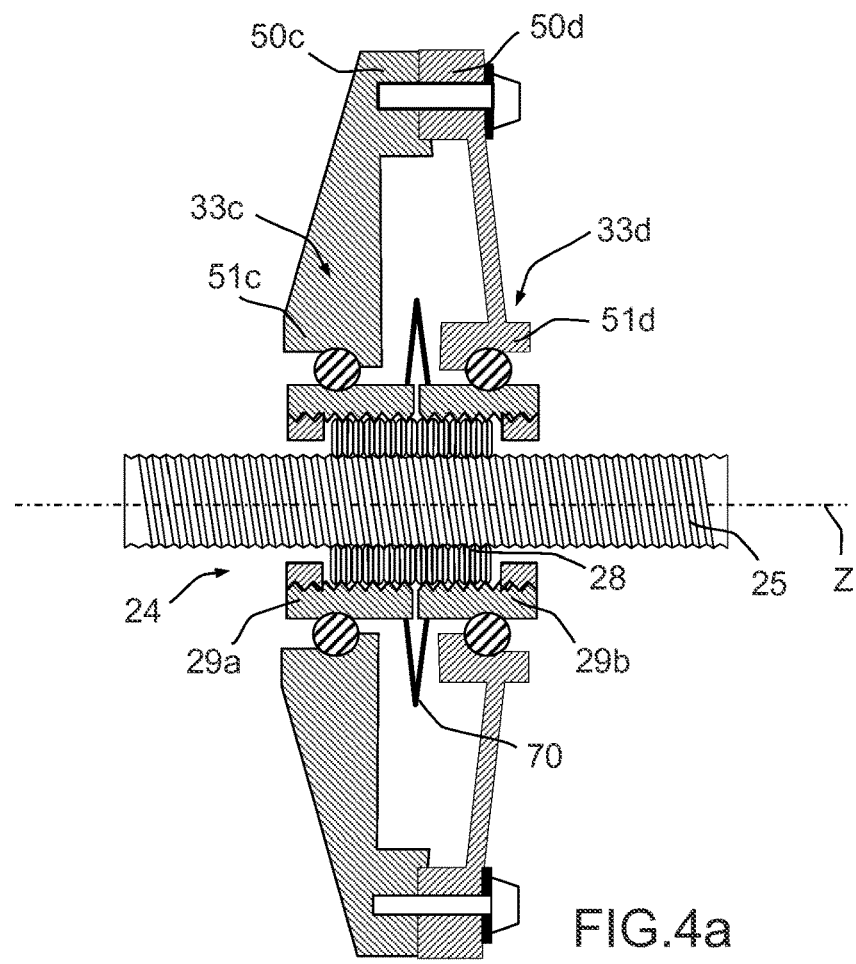
FIGS. 4a and 4b depict a third example of a linear actuator according to the invention comprising a roller screw mechanism guided in rotation.
Figure 4B:
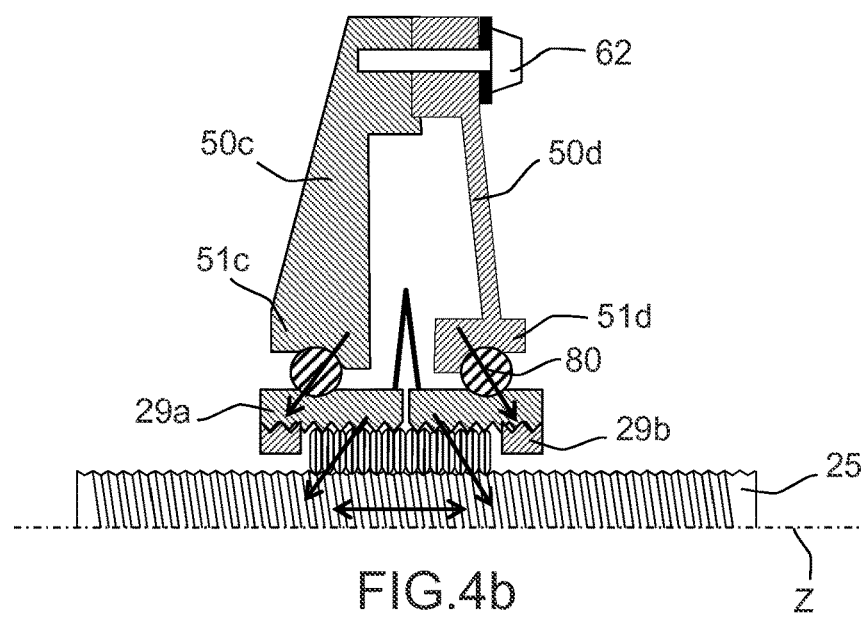

FIGS. 4a and 4b depict a third example of a linear actuator according to the invention comprising a roller screw mechanism guided in rotation with respect to a structure. This third example of a linear actuator is similar to the second example described in FIGS. 2a and 2b. Components that are common bear the same references and are not detailed. In this third example the rotational guidance is afforded by means of two rows of angular-contact ball bearings 33c and 33d mounted in the DB configuration. The tapped rings 29a and 29b of the roller screw mechanism 24 constitute the inner rings of the ball bearings.

In this third example, the structure comprises two half-shells 50c and 50d connected by a set of clamping screws 62. The outer ring 51c of the ball bearing 33c is secured to the first half-shell 50c of the structure. The outer ring 51d of the ball bearing 33d is secured to the second half-shell 50d of the structure. The outer rings 51c and 51d of the two ball bearings are not in contact with one another. The set of clamping screws 62 is configured to apply a force that tends to move the two outer rings 51c and 51d apart. As before, this single preloading device advantageously allows simultaneous loading of the roller screw mechanism and rotational guidance of the roller screw mechanism with respect to the structure. The two outer rings are not in contact with one another and the preload is elastic. As illustrated by FIG. 4b, the preloading device allows lash to be compensated for using a single load path 70 between the half-shells of the structure and the endless screw, via the balls, the angular contacts of the bearings, the tapped rings and the rollers. This elastic preloading device advantageously makes it possible to limit the risk of seizure by friction of the contacting parts.

The invention claimed is:

1. A linear actuator comprising
   a roller screw mechanism guided in rotation with respect to a structure by means of a first and a second angular contact ball bearing, the roller screw mechanism comprising rollers interposed between an endless screw and a first and a second tapped ring which are joined together in rotation and free in translation,
   wherein the first and second tapped rings are secured to a respective ring of the first and of the second angular contact ball bearings,
   the linear actuator further comprising a single preloading device capable of applying load between the two rings of the first and of the second angular contact ball bearings respectively, thereby simultaneously allowing a loading of the roller screw mechanism and a rotational guidance of the roller screw mechanism with respect to the structure,
   wherein first and second angular contact ball bearing form a super duplex bearing type with a hard preloading; and
   wherein the preloading device comprises a bearing surface and an elastic ring clamping the two rings in contact with one another and comprising a set of clamping screws which are configured to apply load to the elastic ring.

2. The linear actuator according to claim 1, wherein the tapped rings constitute the inner rings of the two ball bearings.

3. The linear actuator according to claim 2, wherein the tapped rings are connected by means of a key.

4. The linear actuator according to claim 2, wherein the tapped rings are connected by means of a metal bellows.

5. The linear actuator according to claim 1, wherein the single preloading device comprises an elastic preloading device capable of applying load to the two rings.

6. The linear actuator according to claim 5, of which the structure comprises a first and a second half shell which are secured respectively to the first and second rings, and of which the preloading device is configured to apply a load that tends to bring the two rings closer together, rotational guidance being implemented by the two ball bearings configured in and mounted in a "DF" configuration.

7. The linear actuator according to claim 5, of which the structure comprises a first and a second half-shell which are secured respectively to the first and second rings and of which the preloading device is configured to apply a load that tends to move the two rings apart, rotational guidance being implemented by the two ball bearings configured in and mounted in a "DB" configuration.

8. The linear actuator according to claim 1, wherein the endless screw and the structure are connected in rotation and free in translation.

9. The linear actuator according to claim 8, wherein the endless screw and the structure are connected through a sliding connection.

10. The linear actuator according to claim 1, further comprising a rotary motor capable of driving the rotation of the tapped rings of the roller screw mechanism with respect to the structure.

11. The linear actuator according to claim 1, wherein the rollers comprise circular grooves in contact with the endless screw and with the tapped rings.

* * * * *